United States Patent [19]
Oleson

[11] Patent Number: 5,189,447
[45] Date of Patent: Feb. 23, 1993

[54] INTEGRATED FIELD EYEWEAR SYSTEM

[75] Inventor: Richard A. Oleson, Lexington, Ky.

[73] Assignee: Gentex Corporation, Carbondale, Pa.

[21] Appl. No.: 593,578

[22] Filed: Oct. 9, 1990

Related U.S. Application Data

[63] Continuation of Ser. No. 301,349, Jan. 25, 1989, abandoned.

[51] Int. Cl.⁵ .............................................. G02C 1/08
[52] U.S. Cl. .................................... 351/121; 2/448
[58] Field of Search ................ 351/57, 124, 154, 156, 351/157, 138, 88, 43, 149, 121, 153, 140; 2/440, 441, 442, 443, 444, 445, 446, 448, 449, 450; 16/228

[56] References Cited

U.S. PATENT DOCUMENTS

| | | | |
|---|---|---|---|
| 1,923,567 | 8/1933 | Baker | 351/57 |
| 1,989,876 | 2/1935 | Meyrowitz | 351/51 |
| 4,153,347 | 5/1979 | Myer | 351/121 X |
| 4,306,779 | 12/1981 | Rege | 351/118 |
| 4,405,212 | 9/1983 | Cooper | 351/43 |
| 4,743,105 | 5/1988 | Tabacchi | 351/157 |
| 4,780,928 | 11/1988 | Poz | 351/153 X |
| 4,802,754 | 2/1989 | Neef | 351/138 |
| 4,865,437 | 9/1989 | Neuhaus | 351/121 X |
| 4,934,807 | 6/1990 | Bolle | 351/44 |

Primary Examiner—Rodney B. Bovernick
Attorney, Agent, or Firm—Shenier & O'Connor

[57] ABSTRACT

An integrated field eyewear system of modular construction to permit adaptation to a wide range of wearers and operating conditions. A bridge includes a brow bar formed with slots for alternatively receiving left and right plano lenses or lens frames formed with openings for receiving snap-in corrective lenses. The plano lenses and lens frames are in turn formed with sockets for alternatively receiving either temples or anchors for receiving a headband. Sunshade or laser-protective secondary lenses may be snapped into place over the primary lenses to afford necessary protection. The front consisting of the bridge and the selected viewing elements may be fitted together with a removable goggle frame between the front and the wearer's face. To facilitate their use with lens frames of fixed dimensions, the corrective lenses are formed with bevels conforming to the surface of a sphere of constant radius, even for lenses of different front curvatures.

21 Claims, 13 Drawing Sheets

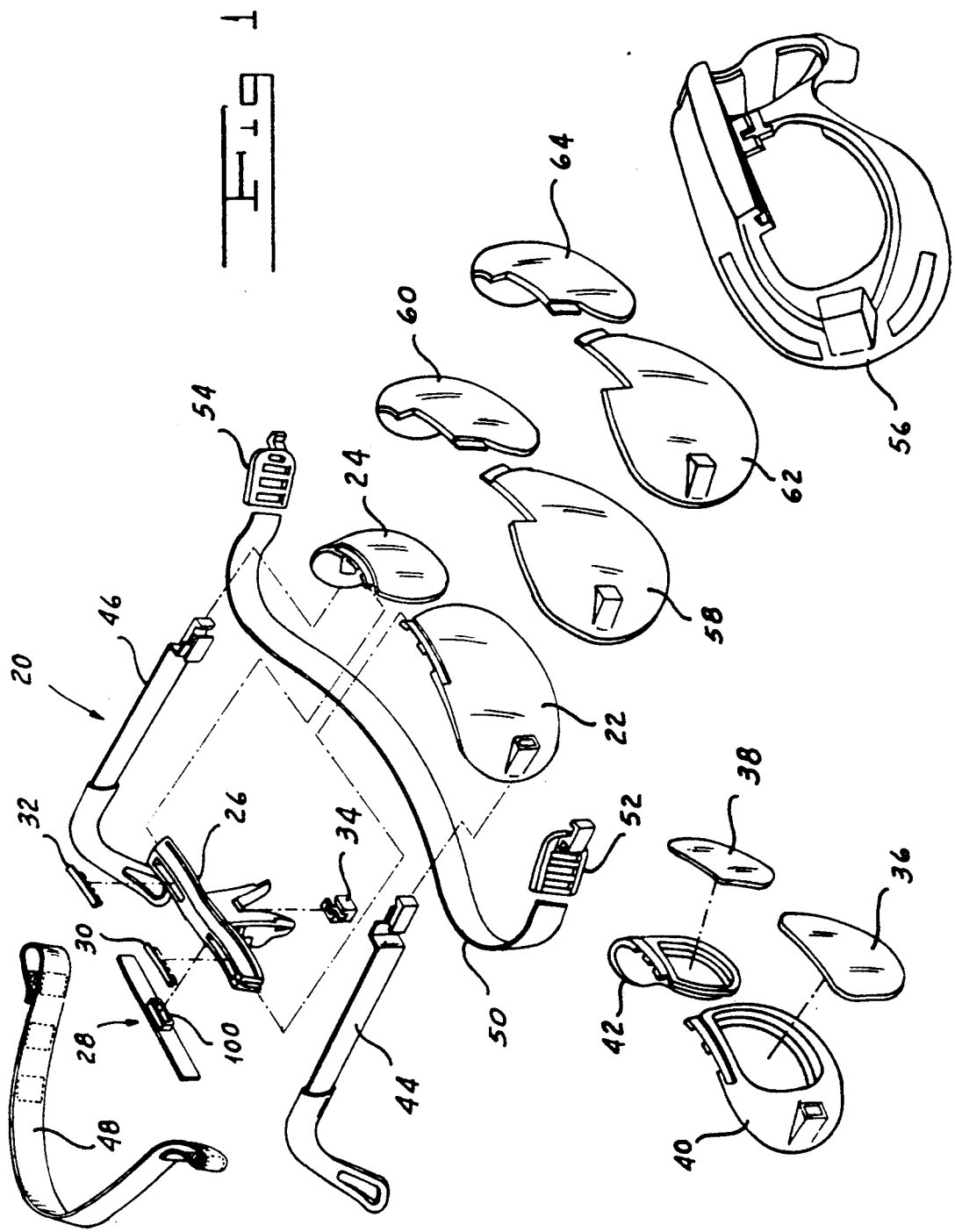

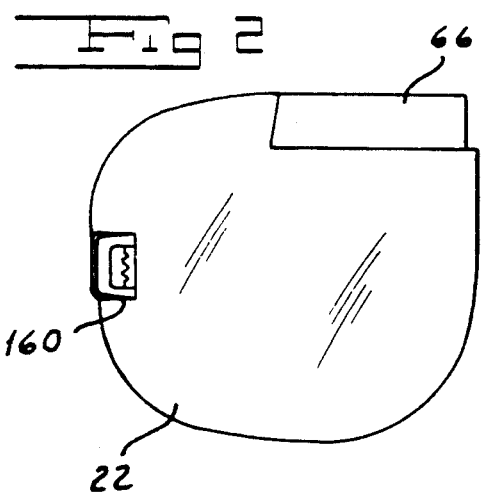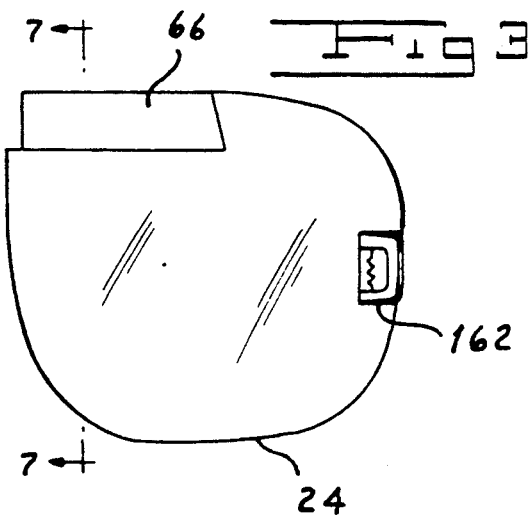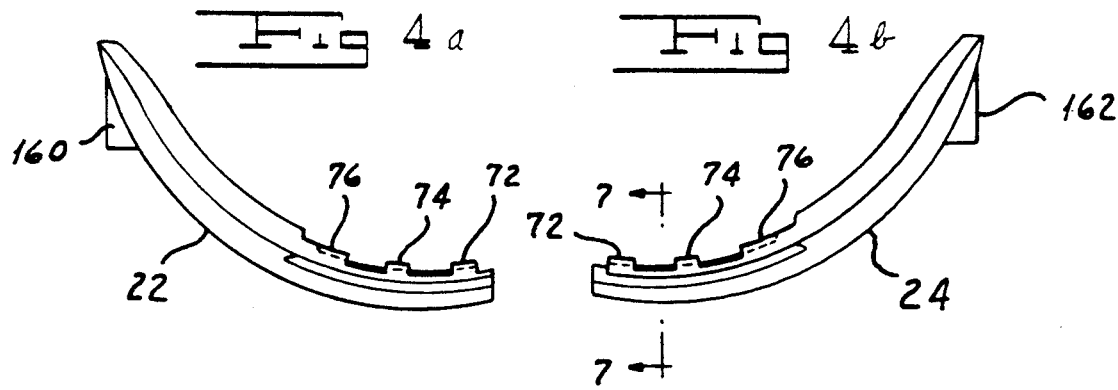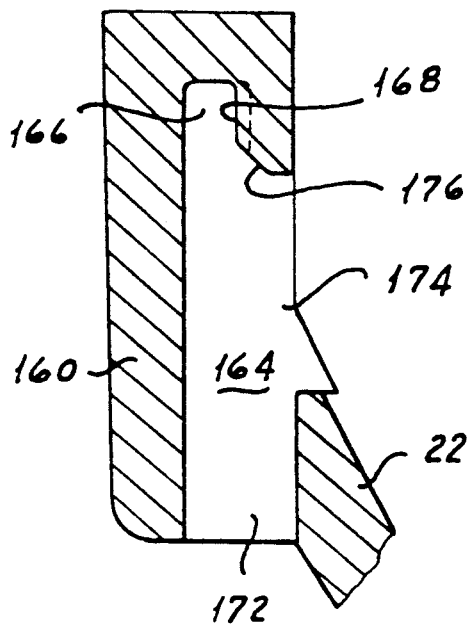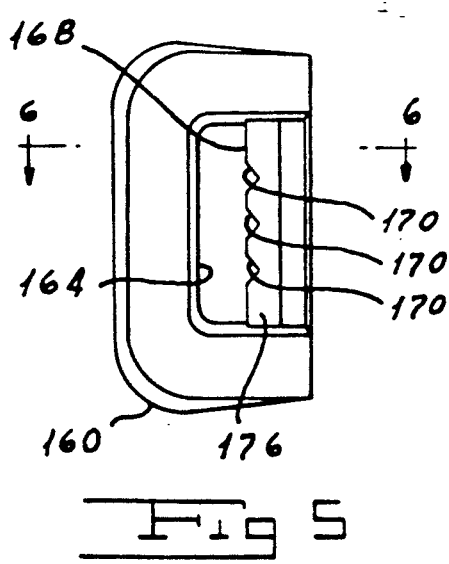

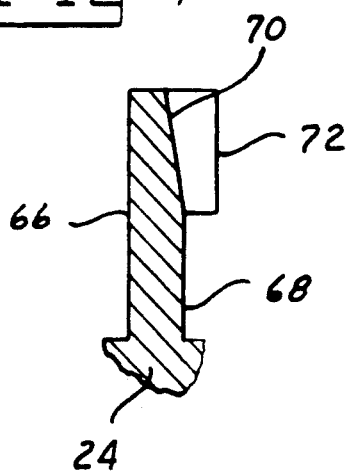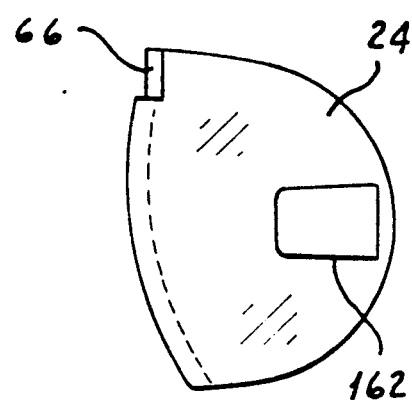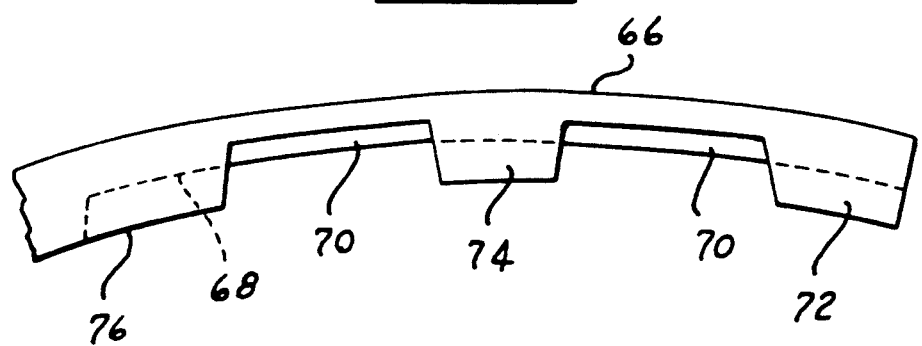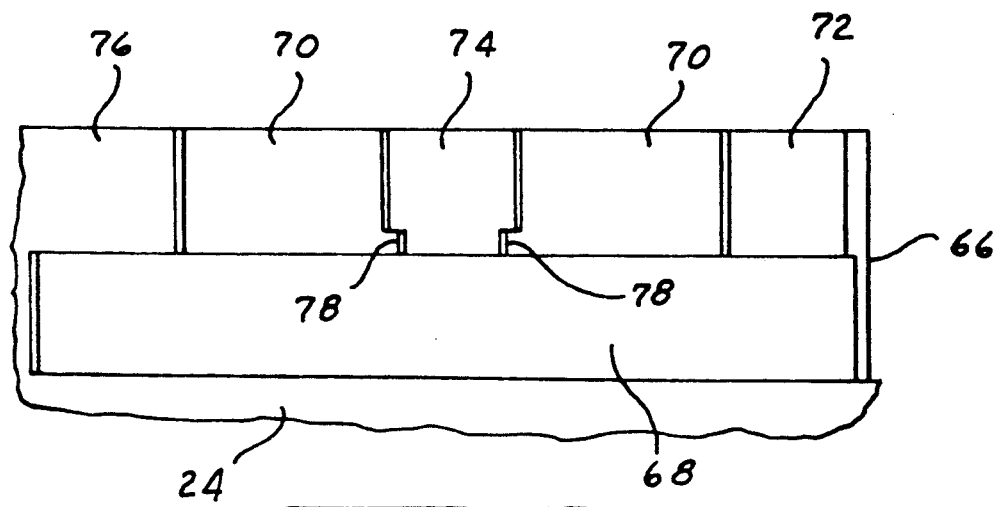

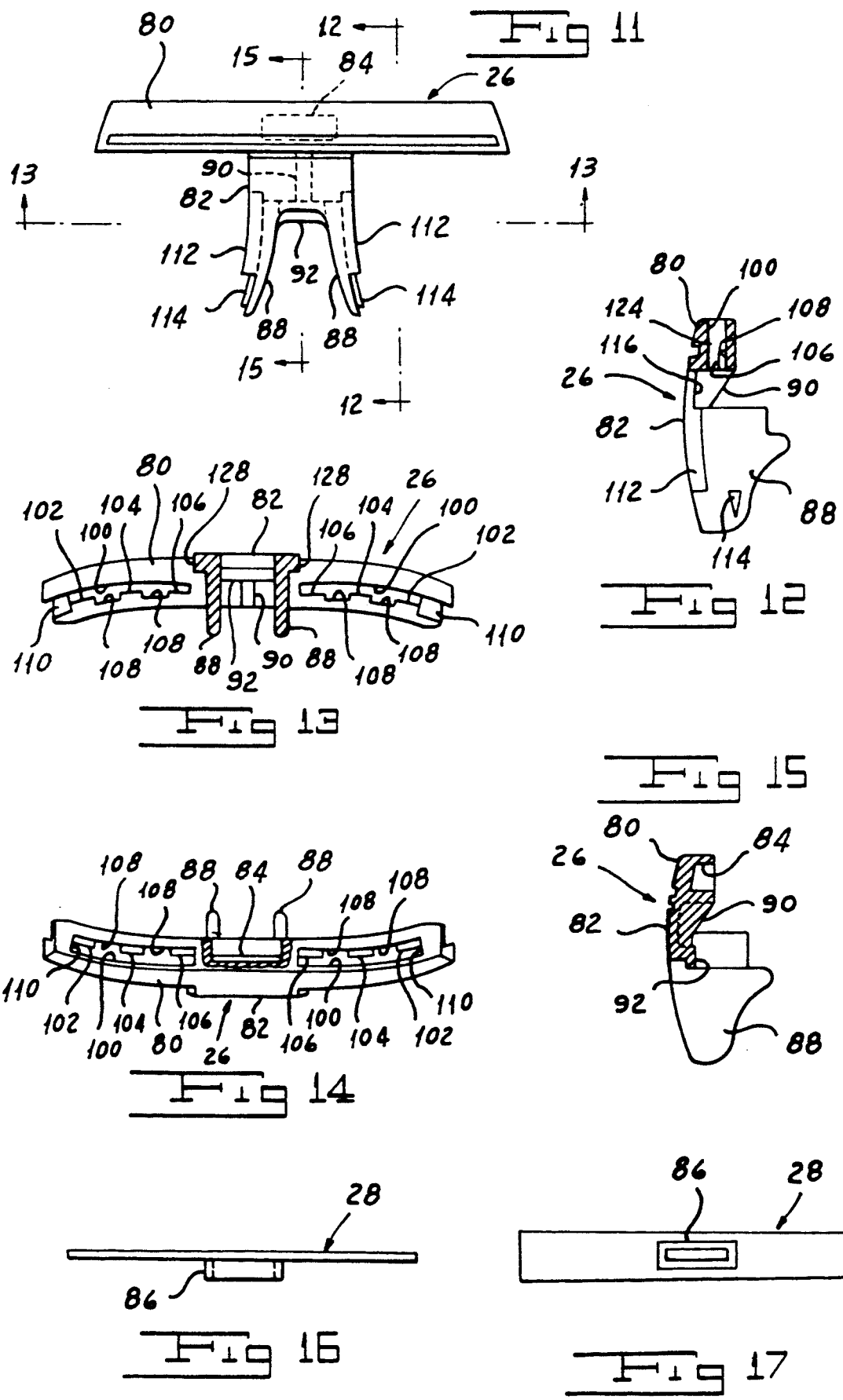

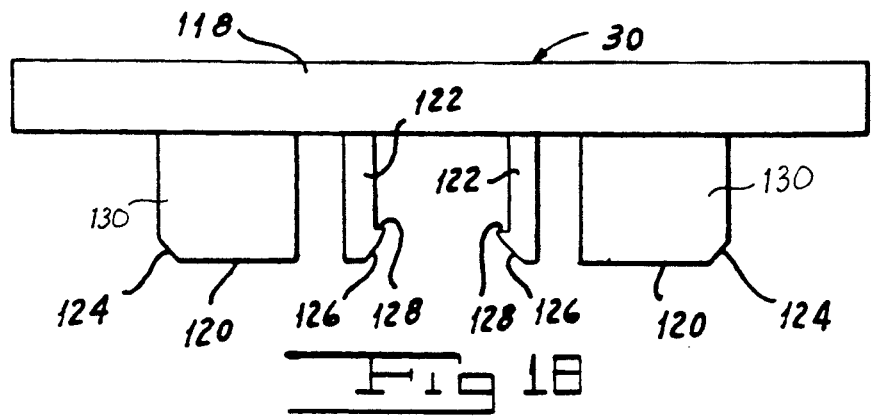
Fig 18
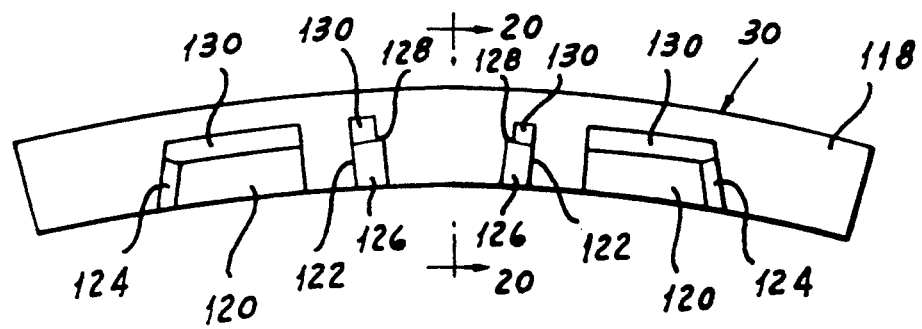
Fig 19
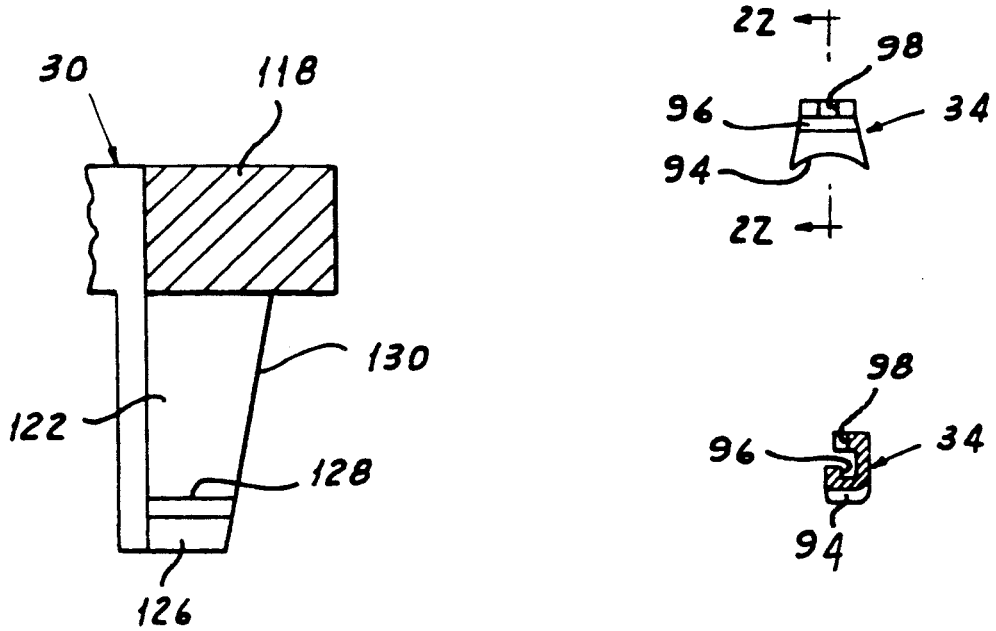
Fig 20
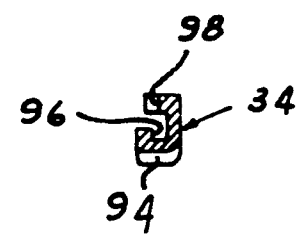
Fig 21
Fig 22

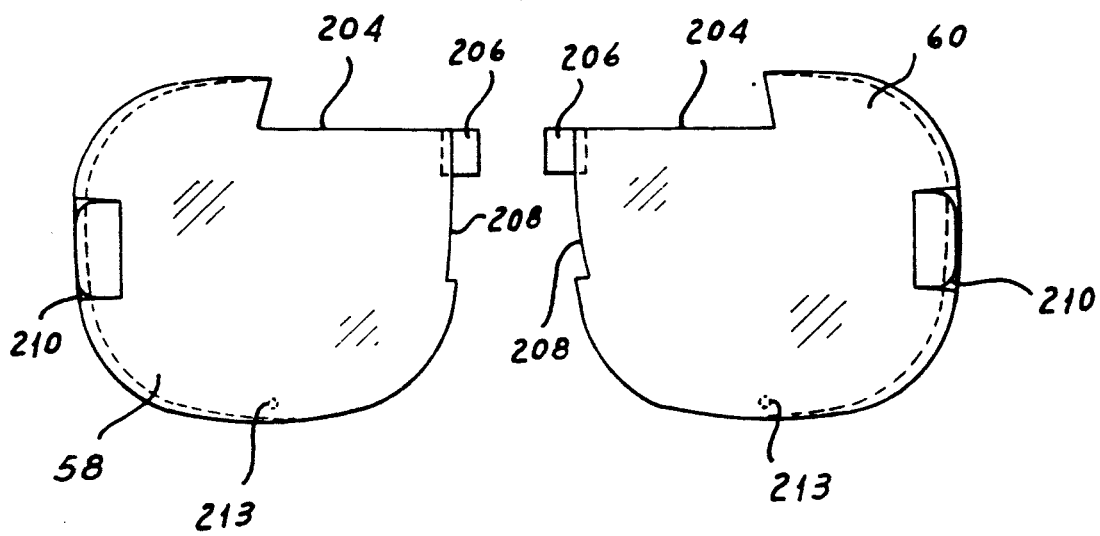

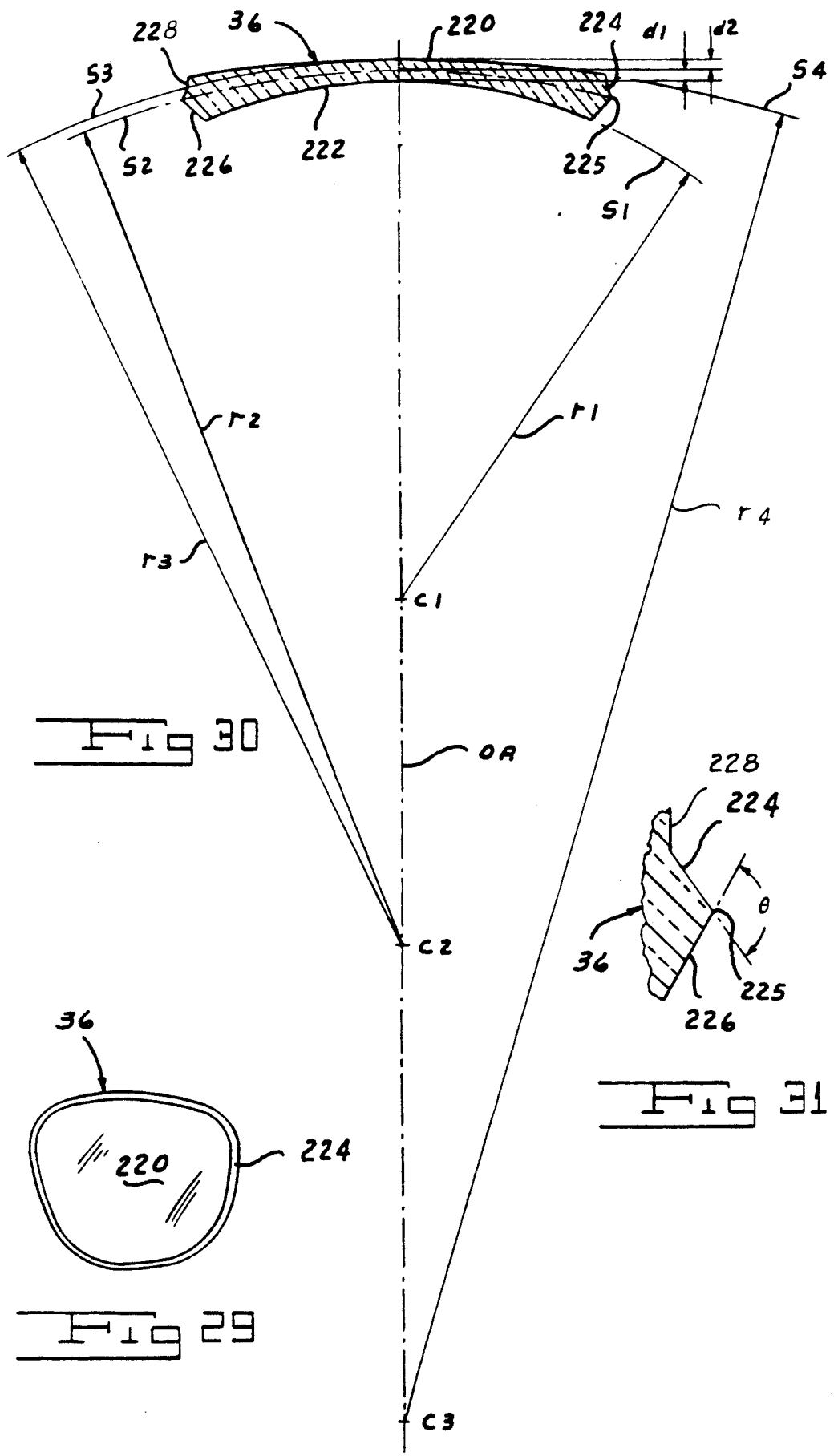

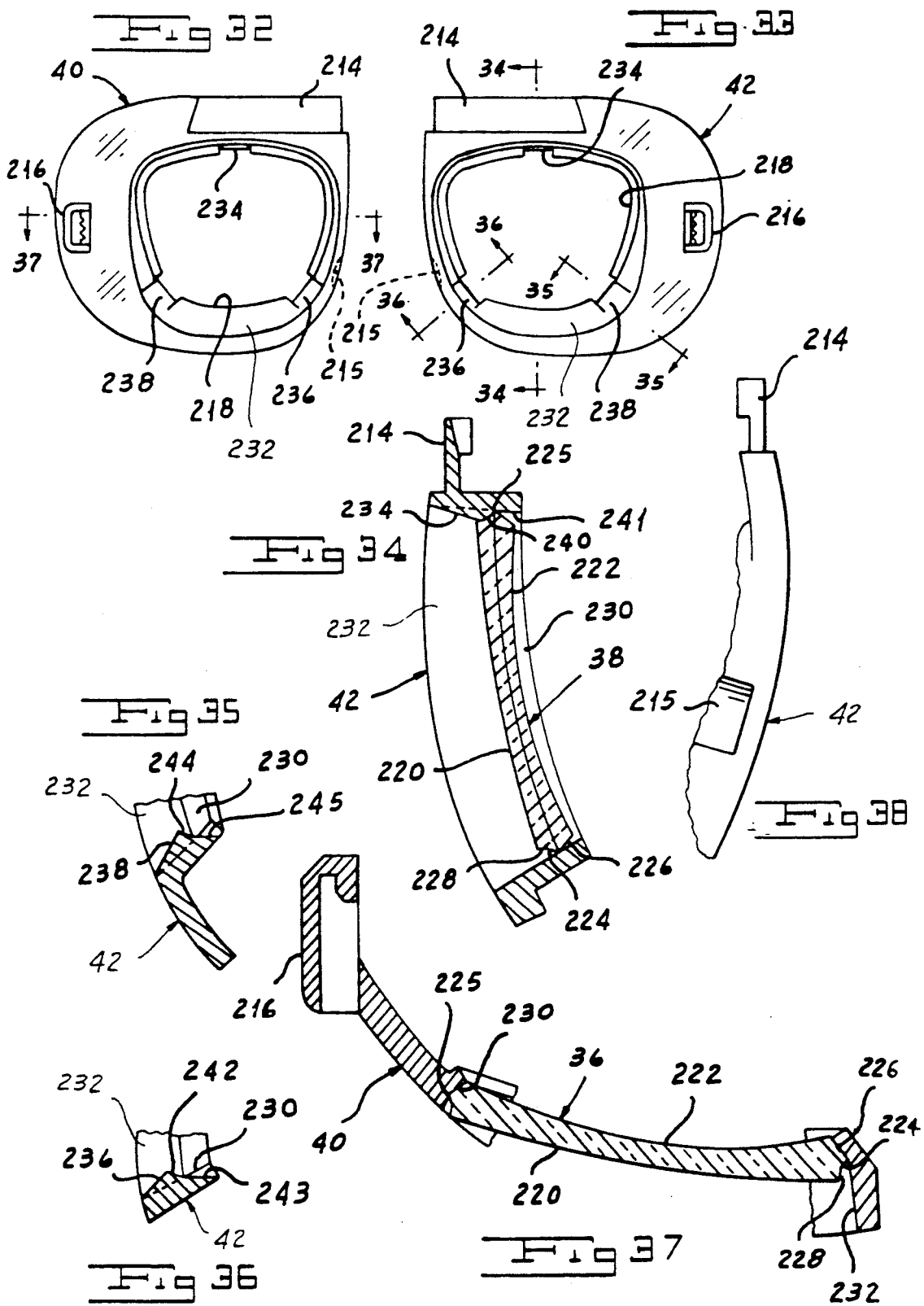

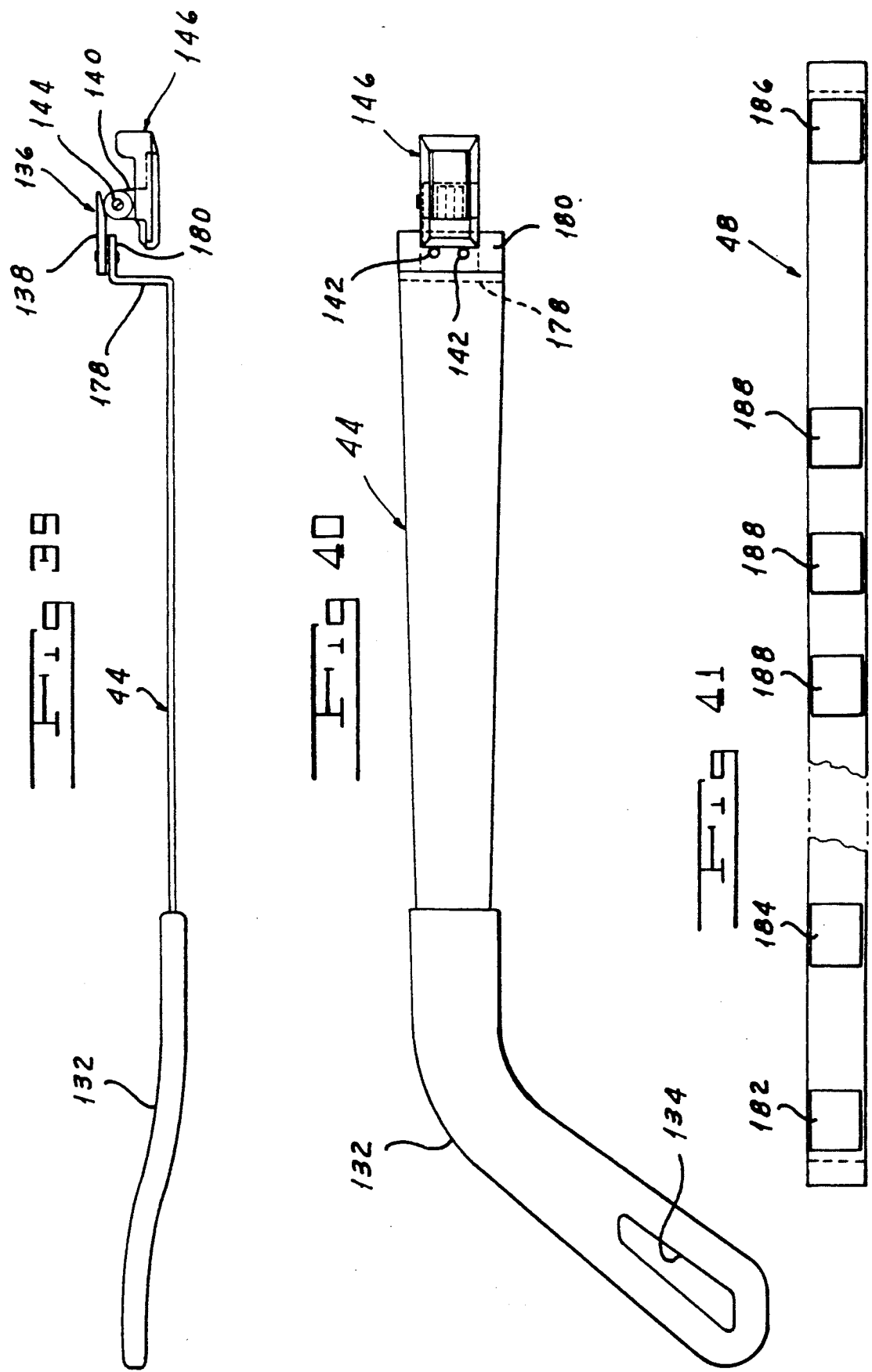

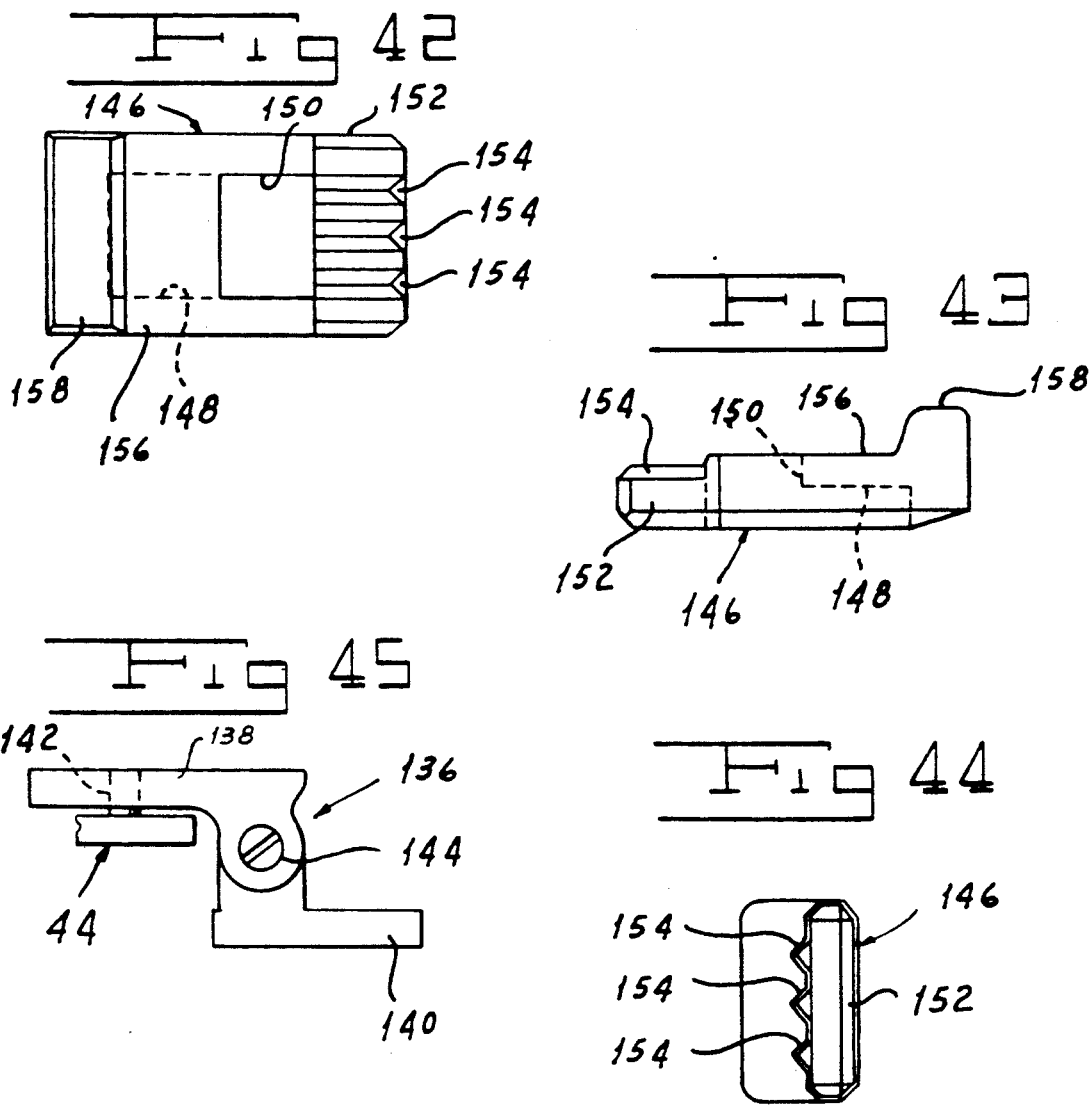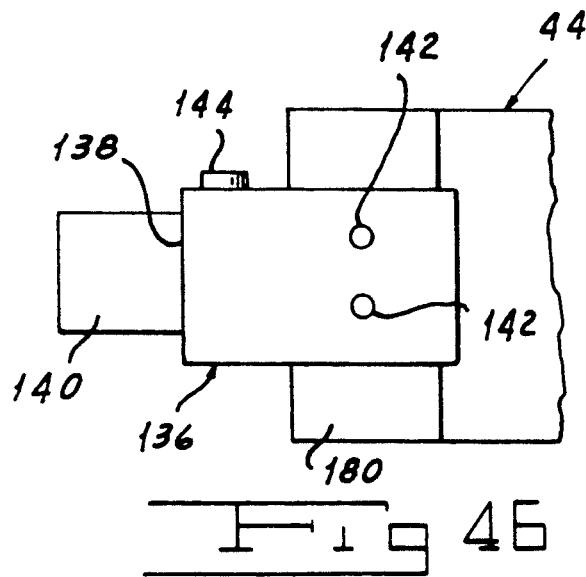

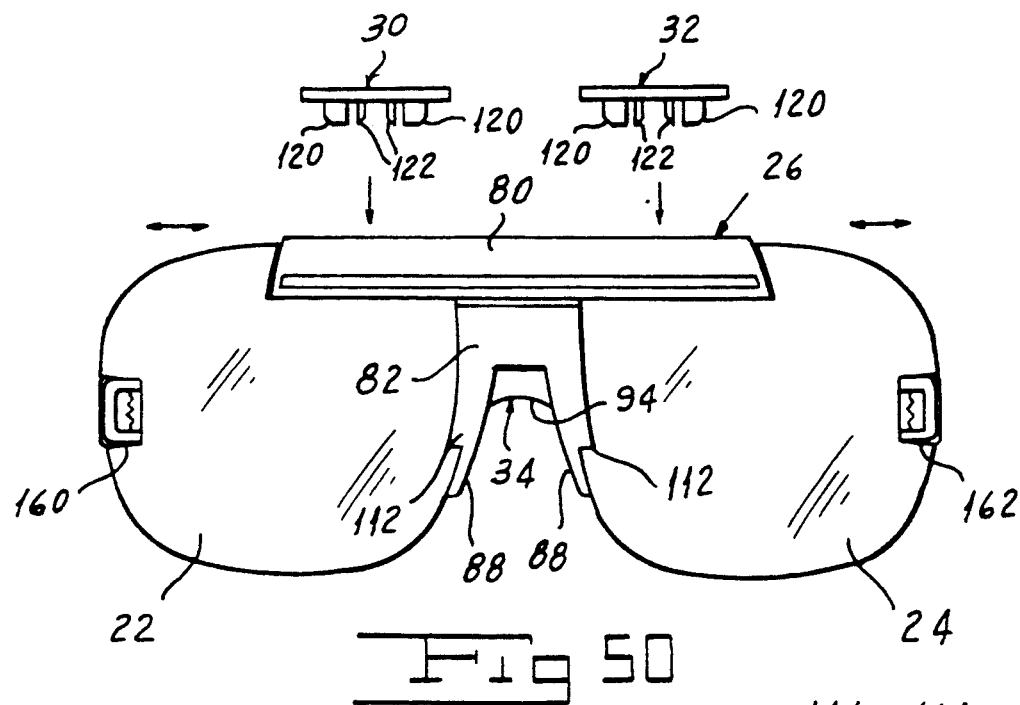
Fig 50
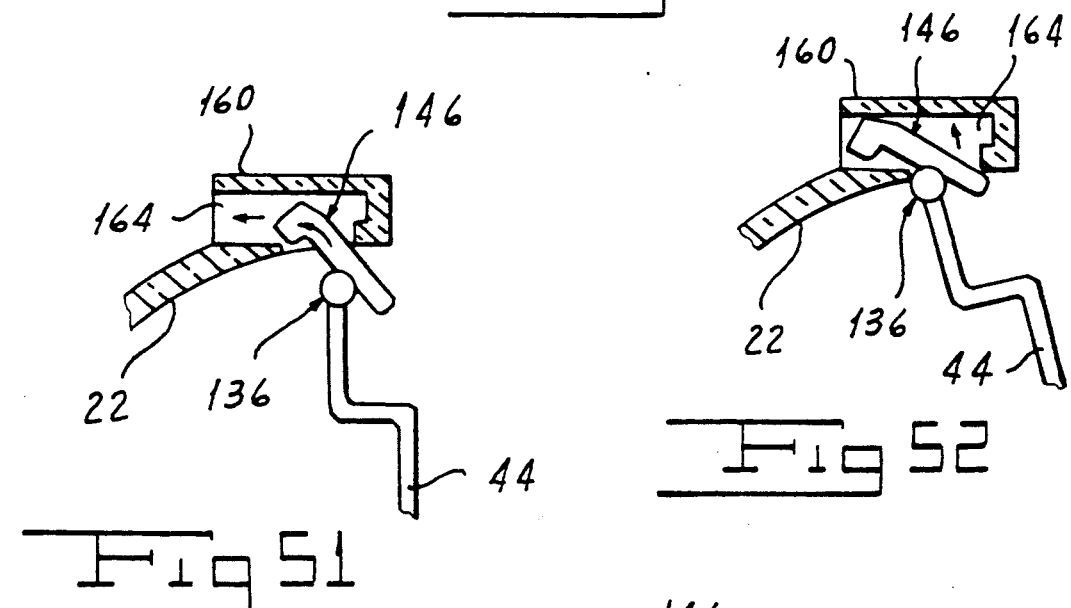
Fig 51
Fig 52
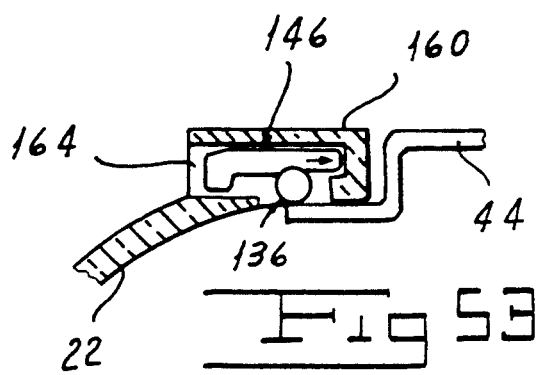
Fig 53

INTEGRATED FIELD EYEWEAR SYSTEM

This is a continuation of copending application Ser. No. 07/301,349, filed on Jan. 25, 1989, now abandoned.

FIELD OF THE INVENTION

This invention relates to a system of protective eyewear intended to provide eye protection to both ametropic and emmetropic wearers against a broad range of hazards in military or other adverse situations.

BACKGROUND OF THE INVENTION

The need for protective eyewear in various hazardous situations, especially those involving military personnel, is well known. However, given the extreme variability of the risk posed and other pertinent factors, it is extremely difficult to design a single system that will protect against all eventualities. Thus, a system that protects against ballistic impacts may not protect against laser radiation. On the other hand, a suitable laser-protective system may have a visual transmittance too low for use in low-light applications. The needs of eyeglass wearers (ametropes) present design problems not encountered when working with persons of normal vision (emmetropes). In general, features that are necessary in a given situation, such as goggles for protection against wind or dust, are unnecessary or undesirable in more normal situations. However, despite this need for eyewear suitable for specific situations, it is impractical to provide each wearer with a different eyewear system for each hazard that might be encountered.

SUMMARY OF THE INVENTION

One of the objects of my invention is to provide an eyewear system which protects against a broad range of hazards.

Another object of my invention is to provide an eyewear system which can be used by a wide range of subjects without requiring manufacture and stocking of various sizes of assembly.

Still another object of my invention is to provide an eyewear system which can be used by both ametropic and emmetropic subjects.

A further object of my invention is to provide an eyewear system which is compatible with headphones.

An additional object of my invention is to provide an eyewear system which may be quickly adapted as conditions change, without special tools.

A still further object of my invention is to provide an eyewear system which may be readily modified to incorporate new technology or to replace damaged components.

Other and further objects will be apparent from the following description.

In one aspect, my invention contemplates an eyewear kit in which a bridge has portions adapted to mate with the nasal edge portions of left and right viewing elements while leaving the temporal portions of the viewing elements unconfined. The viewing elements may comprise lenses that mate directly with the bridge portions or, alternatively, lens frames that mate with the bridge portions and are formed with openings for receiving lenses. Preferably, the kit includes both the lenses and the frames; the lenses may be plano lenses for emmetropes, while the frames accept corrective lenses to avoid the necessity for specially machining the corrective-lens edges. Preferably the bridge comprises a brow portion adapted to extend across the top of the viewing elements, which brow portion is formed with laterally extending slots for receiving upper portions of the viewing elements. Preferably the slots and upper viewing-element portions have interlocking portions restraining the viewing elements against movement transversely of the slot, the viewing-element portions being formed with recesses adapted to receive locking members to prevent withdrawal of the viewing-element portions from the slot.

In another aspect my invention contemplates an eyewear kit in which a front having transparent viewing portions adapted to cover a wearer's eyes, such as the viewing element-bridge subassembly referred to above, and a retaining means, such as a headband or pair of temples, have interengageable portions respectively associated therewith for releasably securing the retaining means to the front. Preferably the interengageable portions comprise a first portion associated with the front and a second portion associated with the retaining means which engages the first portion upon rearward movement of the second portion against the first portion. More particularly, the first portion has a passage with portions extending both forwardly and rearwardly of a side opening, while the second portion comprises a shoe having a forwardly extending toe and a rearwardly extending heel.

In yet another aspect, my invention contemplates a frame, which may be releasably secured to a bridge and temple or headband in the manner described above, and which is formed with an opening for receiving a lens, such as a corrective lens, as well as retaining elements of limited peripheral extent for retaining the lens in the opening. Preferably, the retaining elements are resilient elements that are integrally formed with the frame and which bear against a front surface of the lens such as the surface forming the lens bevel. Preferably, at least three such retaining elements are disposed at approximately equal spacings about the periphery of the opening.

In yet another aspect, my invention contemplates an ophthalmic lens having a periphery of varying distance from the optical axis and a bevel along the periphery that conforms to the surface of a sphere having a center of curvature different from that of the front surface. Preferably, the center of the sphere lies in front of the center of curvature of the front surface, while the lens also has a parallel edge portion adjacent to the front surface and extending generally parallel to the optical axis. Pairs of such lenses intended for the same wearer would have bevels conforming to the surfaces of spheres having equal radii, even though the front surfaces have different curvatures.

Yet another aspect of my invention contemplates an eyewear kit comprising a front having transparent primary viewing elements adapted to cover a wearer's eyes which is retained on the wearer's face by suitable retaining means such as temples or a headband. A transparent secondary viewing element adapted to fit over one of the primary viewing elements has retaining elements extending therefrom which are received in recesses formed in the front to releasably secure the secondary viewing element to the front over the primary viewing element. Preferably, separate secondary viewing elements are provided for each primary viewing element.

A further aspect of my invention contemplates an eyewear kit, adapted to be assembled to form a pair of goggles in which a removable frame mates with a front to form a seal between the front and the wearer's face.

A still further aspect of my invention contemplates an eyewear kit in which a pair of left and right viewing elements each have nasal edge portions and in which a plurality of bridges each have portions adapted to mate with the nasal edge portions of the viewing elements. Each of the bridges has a different spacing between the mating portions thereof to accommodate a range of interpupillary distances.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 1 is a perspective view of the disassembled components of my integrated field eyewear system.

FIG. 2 is a front elevation of the right primary lens of the system shown in FIG. 1.

FIG. 3 is a front elevation of the left primary lens of the system shown in FIG. 1.

FIG. 4a is a top plan of the right primary lens of FIG. 2.

FIG. 4b is a top plan of the left primary lens of FIG. 3.

FIG. 5 is an enlarged front elevation of the temple socket of the right primary lens of FIG. 2.

FIG. 6 is a fragmentary section of the temple socket shown in FIG. 5, along line 6—6 thereof.

FIG. 7 is an enlarged fragmentary section of the left primary lens of FIG. 3, along line 7—7 of FIGS. 3 and 4b.

FIG. 8 is a left side elevation of the left primary lens of FIG. 3.

FIG. 9 is a fragmentary top plan of the insertion portion of the left primary lens of FIG. 3, drawn on an enlarged scale and with the lower portion of the lens omitted.

FIG. 10 is a fragmentary rear elevation of the portion of the left primary lens shown in FIG. 9.

FIG. 11 is a front elevation of the bridge of the assembly shown in FIG. 1.

FIG. 12 is a section of the bridge of FIG. 11 taken along line 12—12 thereof.

FIG. 13 is a section of the bridge of FIG. 11 taken along line 13—13 thereof.

FIG. 14 is a top plan of the bridge of FIG. 11, with portions shown in section.

FIG. 15 is a section of the bridge of FIG. 11 taken along line 15—15 thereof.

FIG. 16 is a top plan of the brow pad of the assembly shown in FIG. 1.

FIG. 17 is a rear elevation of the brow pad shown in FIG. 16.

FIG. 18 is an enlarged front elevation of one of the lens locks of the assembly shown in FIG. 1.

FIG. 19 is a bottom plan of the lens lock shown in FIG. 18.

FIG. 20 is a further enlarged fragmentary section of the lens shown in FIG. 18, taken along line 20—20 of FIG. 19.

FIG. 21 is a rear elevation of the nose pad of the assembly shown in FIG. 1.

FIG. 22 is a section of the nose pad of FIG. 21 taken along line 22—22 thereof.

FIG. 23 is a front elevation of the right sunshade attachment lens of the assembly shown in FIG. 1.

FIG. 24 is a front elevation of the left sunshade attachment lens of the assembly shown in FIG. 1.

FIG. 25 is a horizontal section of the right attachment lens shown in FIG. 23.

FIG. 26 is a top plan of the left attachment lens shown in FIG. 24.

FIG. 27 is a left side elevation of the left attachment lens of FIG. 24.

FIG. 28 is a section of a portion of the left attachment lens of FIG. 24 along line 28—28 of FIG. 26.

FIG. 29 is a front elevation of a right corrective lens for the assembly shown in FIG. 1.

FIG. 30 is an enlarged section of the lens shown in FIG. 29.

FIG. 31 is a further enlarged fragmentary section of the lens shown in FIGS. 29 and 30.

FIG. 32 is a front elevation of the right corrective lens frame of the assembly shown in FIG. 1.

FIG. 33 is a front elevation of the left corrective lens frame of the assembly shown in FIG. 1.

FIG. 34 is an enlarged section of the left lens frame of FIG. 33 with the lens in place, along line 34—34 thereof.

FIG. 35 is an enlarged fragmentary section of the left lens frame of FIG. 33 along line 35—35 thereof.

FIG. 36 is an enlarged fragmentary section of the lens frame of FIG. 33 along line 36—36 thereof.

FIG. 37 is an enlarged fragmentary section of the right lens frame of FIG. 32 with the lens in place, along line 37—37 thereof.

FIG. 38 is an enlarged fragmentary right side elevation of the left lens frame shown in FIG. 33.

FIG. 39 is an enlarged top plan of the right temple of the assembly shown in FIG. 1.

FIG. 40 is a right side elevation of the right temple of the assembly shown in FIG. 1.

FIG. 41 is a fragmentary elevation of the retaining strap of the assembly shown in FIG. 1.

FIG. 42 is a further enlarged left side elevation of the hinge support of the temple shown in FIGS. 39 and 40.

FIG. 43 is a top plan of the hinge support of FIG. 42.

FIG. 44 is a rear elevation of the hinge support of FIG. 42.

FIG. 45 is an enlarged fragmentary top plan of the hinge portion of the temple shown in FIGS. 39 and 40.

FIG. 46 is a fragmentary left side elevation of the hinge portion shown in FIG. 45.

FIG. 50 is a front elevation of the primary lens-bridge subassembly with the lenses attached to the bridge and the lens locks removed.

FIG. 51 is a simplified fragmentary section of the right primary lens and right temple during the first step of their assembly.

FIG. 52 is a simplified fragmentary section of the right primary lens and right temple during the second step of their assembly.

FIG. 53 is a simplified fragmentary section of the right primary lens and right temple during the third step of their assembly.

DESCRIPTION OF THE PREFERRED EMBODIMENT

Figure 47:
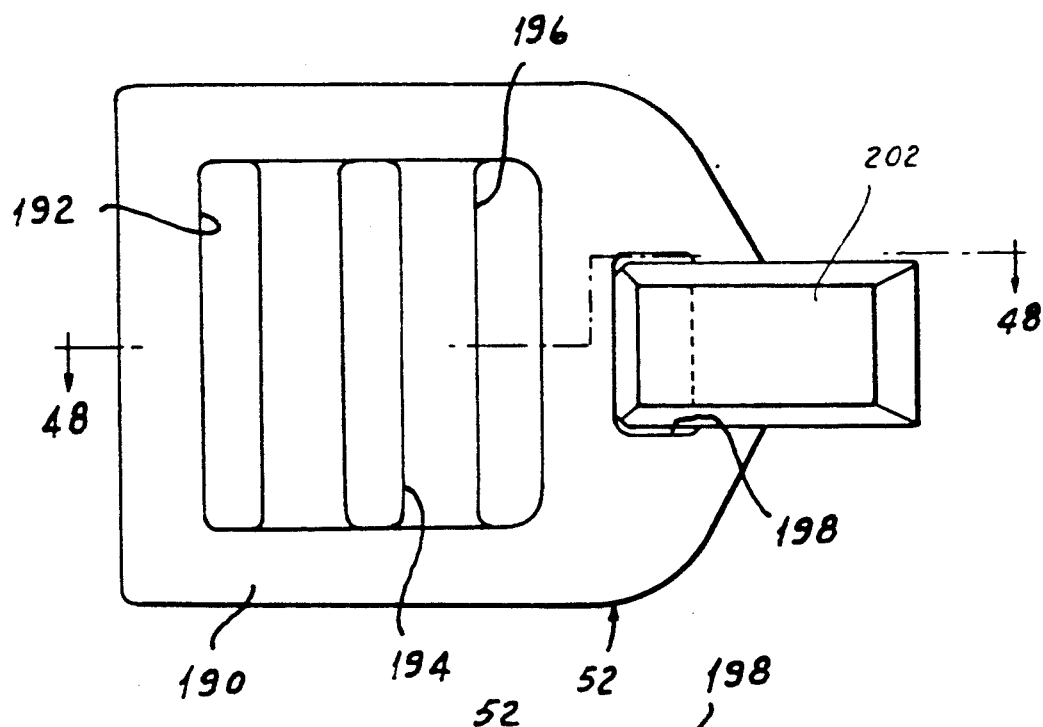
FIG. 47 is a right side elevation of the right headband anchor of the assembly shown in FIG. 1.

Referring to FIG. 1, my integrated field eyewear system, indicated generally by the reference numeral 20, comprises a right primary lens 22 and a left primary lens 24 adapted to be secured to a bridge 26 in a manner to be described below. Bridge 26 carries an elastomeric brow pad 28 for contacting the wearer's brow as well as an elastomeric nose pad 34 for contacting the wearer's nose. Respective lens locks 30 and 32 inserted into slots formed in bridge 26 lock primary lenses 22 and 24 in place. As an alternative to primary lenses 22 and 24, the wearer may secure to bridge 26 respective frames 40 and 42, generally similar in outline to lenses 22 and 24, for receiving snap-in corrective lenses 36 and 38.

Primary lenses 22 and 24 or corrective lens frames 40 and 42 receive right and left temples 44 and 46, which extend over the wearer's ears and optionally receive a retaining strap 48 for preventing the assembly from being dislodged from the wearer's head. Alternatively, lenses 22 and 24 or frames 40 and 42 may receive respective right and left anchors 52 and 54 for receiving a headband 50, which may be used, for example, if the wearer is also using a pair of earphones. A sun-wind-dust attachment or goggle frame 56 may, if desired, be fitted over the entire lens-bridge assembly to completely enclose the region between lenses 22 and 24 or frames 40 and 42 and the wearer's eyes. Respective right and left sunshade attachment lenses 68 and 60 may be snapped in place over lenses 22 and 24 or frames 40 and 42 to provide desired attenuation of visible light as well as, possibly, adjacent regions of the ultraviolet and infrared bands. Respective right and left laser attachment lenses 62 and 64 may alternatively be snapped in place over lenses 22 and 24 or frames 40 and 42 to protect against laser radiation.

Referring to FIGS. 2 to 4b and 8, right and left primary lenses 22 and 24 are plano lenses preferably formed of molded polycarbonate resin such as the resin sold by Mobay Chemical Company of Pittsburgh, Pa. 15205, under the trademark MERLON M40. Preferably lenses 22 and 24 are about 2 millimeters thick to provide the desired protection against ballistic impacts. The peripheries of lenses 22 and 24 are generally curved, but include right-angle corners formed by the upper and nasal edges. Lenses 22 and 24 are mirror images of each other. Accordingly, in the discussion that follows, any reference to a particular lens 22 or 24 also applies to the other lens, the appropriate mirror-image reversal being made if necessary.

Each of lenses 22 and 24 has a portion 66 extending generally horizontally from the upper nasal corner for insertion into a slot (to be described) in bridge 26. Insertion portion 66 is recessed from the front surface of the lens 22 or 24, as shown in FIG. 7. Referring to FIGS. 9 and 10, insertion portion 66 has a slot 68 extending horizontally along the bottom of the rear surface of the insertion portion from the nasal edge of the lens 22 or 24. Slot 68 adjoins a spaced pair of upwardly extending slots 70, the front walls of which are sloped slightly from the vertical tord the front of the lens 22 or 24, as shown in FIG. 7. Slots 68 and 70 define unrecessed portions, or lands, on the rear surface of insertion portion 66 comprising an inboard land 72 adjacent to the nasal edge of the lens 22 or 24, a middle land 74 between vertical slots 70, and an outboard land 76 remote from the nasal edge. As shown in FIG. 10, the lower edges of middle land 74 adjacent to slots 70 are formed with rectangular cutouts 78 for a purpose to be described.

Referring now to FIGS. 11 to 15, the bridge 26, which is preferably formed from a pigmented plastic such as polycarbonate, comprises a transverse portion or brow bar 80, to which lenses 22 and 24 are attached, and a nasal portion 82 which extends downwardly from transverse portion 80 and rests on the wearer's nose. Referring now also to FIGS. 16 and 17, brow pad 28, which comprises a suitable elastomeric material such as noncellular polyurethane, is formed with a rectangular plug 86 that fits into a corresponding rectangular slot 84 in the rear surface of transverse bridge portion 80. Nasal portion 82 comprises a pair of generally flat downwardly and rearwardly extending rests 88 for contacting the sides of the wearer's nose. An angle portion 90 extending between nasal portion 82 and transverse portion 80 strengthens portion 82, while a thickened portion 92 extending transversely along the lower edge of nasal portion 82 between nasal rests 88 performs a comparable reinforcing function.

Referring now also to FIGS. 1, 21 and 22, nasal pad 34, which comprises a suitable elastomeric material similar to that of brow pad 28, is formed with a concave lower surface portion 94, complementary to a typical wearer's nose, as well as transverse slot 96 for receiving reinforcement portion 92 and a vertically extending slot 98 for receiving angle portion 90 of bridge 26. Nose pad 34 is fitted onto bridge 26 by aligning the pad so that portion 94 faces downwardly and slots 96 and 98 face forwardly, as shown in FIG. 1. Slots 96 and 98 are then mated with respective bridge portions 92 and 90 to secure pad 34 to the bridge 26.

The transverse portion 80 of bridge 26 is formed with a pair of spaced slots 100 for receiving portions 66 of respective lenses 22 and 24. Each slot 100 is open at the outboard end, as well as along the top and bottom. Each slot 100 is shaped to permit lengthwise insertion of the portion 66 of lens 22 or 24 through the opening at the end of the slot to form the lens-bridge subassembly shown in FIG. 50. Respective projections 102, 104 and 106 formed at spaced locations along the lower portion of the rear surface of each slot 100 are so spaced as to underlie respective lands 72, 74 and 76 of lens portion 66 when the lens 22 or 24 is fully inserted in the slot 100. Correspondingly, with the lenses fully inserted, the recesses 108 between adjacent pairs of projections 102 to 106 will underlie recesses 70 of lens portions 66. Projections 102 to 106 of each slot 100 thus cooperate with lands 72 to 76 of each insertion portion 66 to prevent removal of the lens 22 or 24 downwardly out of the slot 100. A cross-portion 110 closing off the top of the end opening and the nasal end of the top of slot 100 prevents removal of lens insertion portion 66 upwardly out of slot 100. In the fully inserted position of lens portion 66 into slot 100, the nasal edge of the lens 22 or 24 abuts the adjacent nasal rest 88 of bridge 26 (FIG. 50). A front lip 112 and a rear lip 114 formed on the outboard surface of each nasal rest 88 define a channel for receiving the nasal edge of the lens 22 or 24. Front lip 112 is formed with a recess 116 along the upper portion of its rear edge to permit insertion of a retaining tab of an attachment lens to be described between the primary lens 22 or 24 and the front lip 112.

Referring now to FIGS. 18 to 20, right lens lock 30, to which left lens lock 32 is identical, comprises a generally horizontally extending curved upper portion 118 complementary to the upper opening in slot 100, shown in FIG. 14. Lens lock 30, which may be formed of the same material as bridge 26, is inserted into slot 100 through its top opening to prevent removal of lens portion 66 from the slot (FIGS. 1 and 50). To this end, the transverse portion 118 of lens lock 30 has an outboard pair of depending portions 120 as well as an inboard pair of depending portions 122 between outboard portions 120. As shown in FIGS. 18 and 19, outboard portions 120 have an appreciable extent along transverse portion 118, whereas inboard portions 122 are of relatively slight extent in that direction so as to serve as resilient locking members in a manner to be described. Each outboard portion 120 together with the adjacent inboard portion 122 fits into one of the recesses 70 formed between projections 72 to 76 of insertion portion 66. Portions 120 and 122 have sloping front sidewalls 130 to facilitate insertion of lock 30 into slot 100. For a similar purpose, each outboard portion 120 is formed with a chamfer 124 along its lower outboard edge, while each inboard portion 126 is formed with a chamfer 126 along its lower inboard edge. Each portion 122 is also formed at the upper end of chamfer 126 with a catch 128 which engages one of the rectangular cutouts 78 of land 74 when lock 30 is inserted into slot 100 with lens 22 in place. Owing to the provision of this catch 128, lens lock 30, once inserted into slot 100, cannot be removed without special tools. This further decreases the chance that the lenses 22 and 24 will become inadvertently separated from bridge 26 because a lens lock has slipped out of place.

Referring now to FIGS. 1, 39 and 40, right temple 44, of which left temple 46 is a mirror image, is generally formed of metal (e.g., aluminum) but has a soft elastomeric (e.g., PVC) covering 132 on the ear rest at the rear, which portion is formed with a slot 134 for receiving retaining strap 48. A hinge indicated generally by the reference numeral 136 supports temple 44 at the front for pivotal movement relative to a hinge support indicated generally by the reference numeral 146. Hinge 136 comprises a first hinge portion 138 secured to temple 44 by any suitable means such as rivets 142 and a second hinge portion 140 pivotally attached to portion 138 by means of a screw 144. Referring also to FIGS. 42 to 46, hinge support 146 is formed with a recess 148 in its outer surface communicating with the opposite surface of support 146 through a slot 150. Recess 148 and slot 150 are so dimensioned relative to portion 140 of hinge 136 that hinge support 146 may be attached to hinge 136 by inserting portion 140 through slot 150 and seating the portion 140 in recess 148. Any suitable adhesive may be used to retain hinge portion 140 in slot 148. Hinge support 146 comprises a rearwardly extending heel 152 formed with longitudinal ridges 154 on its inboard surface and a forwardly extending toe 156 having a hook 158 projecting toward the wearer's face.

Referring again to FIGS. 2 to 6 and 8, right and left primary lenses 22 and 24 are formed with respective sockets 160 and 162 for receiving the hinge supports 146 to which temples 44 and 46 are pivotally attached. More specifically, referring particularly to FIGS. 5 and 6, each of sockets 160 and 162 is formed with a passage 164 extending generally fore and aft with respect to the wearer's head. The rear portion 166 of the passage 164, which is closed, has an inboard wall 168 formed with longitudinal notches 170 complementary to ridges 154 of hinge support 146. Passage 164 also has a front opening 172 communicating with the front surface of the lens 22 or 24, as well as a side opening 174 communicating with the rear surface of the lens as shown in FIG. 6. To facilitate insertion of the rear portion 152 of hinge support 146 into the rear portion 166 of passage 164, the leading edge of inboard wall 168 is preferably formed with a chamfer 176 as shown in FIG. 6.

Referring now also to FIGS. 51 to 53, hinge support 146, and thus temple 44 or 46, is inserted in socket 160 or 162 by first inserting toe 156 of the hinge support 146 into the passage 164 through the inboard side opening 174 (FIG. 51). The hinge support 146 is then pushed forwardly into passage 164 (FIG. 52) to such a position that the heel 152 clears the rear edge of inboard side opening 174. The hinge support 146 is then pulled rearwardly (FIG. 53) to insert heel 152 into the rear portion 166 of the passage 164, with notches 170 engaging ridges 154. Providing the mating surface portions of the support 146 and socket 160 or 162 with ridges and notches in the manner described improves the frictional engagement of the support with the socket owing to the increased surface area of contact. The hook 158 formed on the toe 156 of hinge support 146 prevents undesirable lateral movement of that end of the support 146 in the passage 164.

Referring again to FIGS. 39 and 40, each of temples 44 and 46 is formed near the front end with a first, inwardly bent portion 178, which portion 178 is formed with a second, forwardly bent portion 180 to which hinge 136 is attached. The result of this double bend is that when the hinge support 146 is fully inserted in the socket 160 or 162, and the temple 44 or 46 pivoted rearwardly (FIG. 53), as it would be when worn, portion 178 of the temple engages the socket 160 or 162, preventing withdrawal of the hinge support 146 from the socket, no matter how strong the retracting force. As a result, temples 44 and 46 cannot be dislodged from lenses 22 and 24 in any normal circumstance of operation, so long as the temples are oriented rearwardly in an open position. To remove the temples 44 and 46 from sockets 160 and 162, the wearer simply reverses the procedure. Thus, after folding the temple 44 or 46 in the direction of lenses 22 and 24, the wearer pushes the hinge support 146 forwardly to withdraw the heel 152 of the hinge support from the rear portion of socket 160 or 162. The wearer then swings the heel 152 out of the passage 162 through side opening 174, after which the wearer may remove the toe 156 through the same side opening.

As noted above, each of temples 44 and 46 is provided with a slot 134 at the rear for receiving an optional retaining strap 48. Referring now also to FIG. 41, strap 48, which may comprise an elastic webbing, carries a patch 182 of hook or loop fastener material at one end as well as a patch 184 of complementary fastener material at a small spacing from patch 182. The other end of strap 48 carries a patch 186 of fastener material similar to patch 184 as well as three patches 188 of complementary fastener material at spaced locations along the length of strap 48. Retaining strap 48 is secured to temples 44 and 46 by passing the first end of strap 48 through one of the slots 134 and closing fastener patch 182 on patch 184 and then passing the other end of strap 48 through the other slot 134 and then closing that end by pressing patch 186 against one of patches 188. Providing a plurality of patches 188 allows adjustment of the tension in strap 48 as well as accommodation of a range of head sizes.

Figure 48:
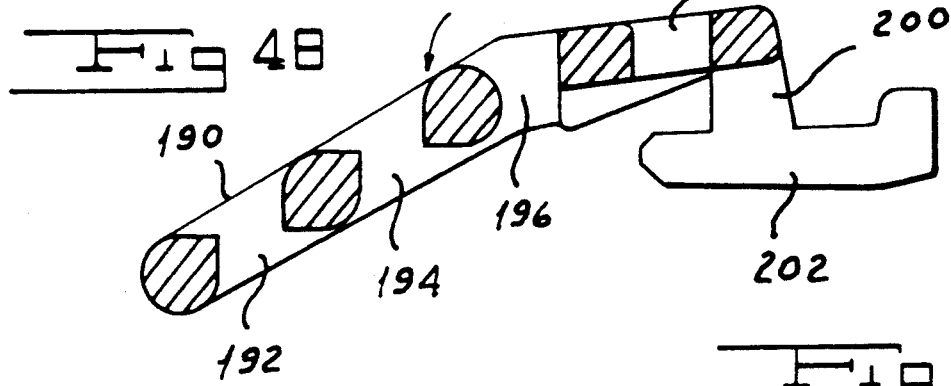
FIG. 48 is a section of the headband anchor of FIG. 47 along line 48—48 thereof.

Referring now to FIGS. 1, 47 and 48, as an alternative to temples 44 and 46, the wearer may instead use headband 50 to retain lenses 22 and 24 in position. Headband 50, which may comprise any suitable material such as elastic webbing, is secured to sockets 160 and 162 by means of identical headband anchors 52 and 54, the right anchor 52 of which is shown in FIGS. 47 and 48. Anchors 52 and 54 may be formed of the same material as bridge 26. As indicated in FIGS. 47 and 48, the headband anchor 52 comprises a band-receiving portion 190 formed with transverse spaced slots 192, 194 and 196 for receiving headband 50. Headband anchor 52 has an outwardly extending shank 200 at the front which supports an integrally formed shoe 202, which is inserted into socket 160 to secure anchor 52 to lens 22. As is evident from FIGS. 47 and 48, shoe 202 is substantially identical in construction to hinge support 146. To facilitate molding, headband anchor 52 is also formed with an aperture 198 in the body thereof opposite the heel of shoe 202. Headband 50 is secured to headband anchor 52 by passing the end of the headband first inwardly through slot 192, then outwardly through slot 194, then inwardly through slot 196, and then outwardly again through slot 192. The shoe 202 is then inserted into socket 160 of lens 22 in a manner similar to that of hinge support 146, and may be removed in a similar manner as well.

Figure 54:
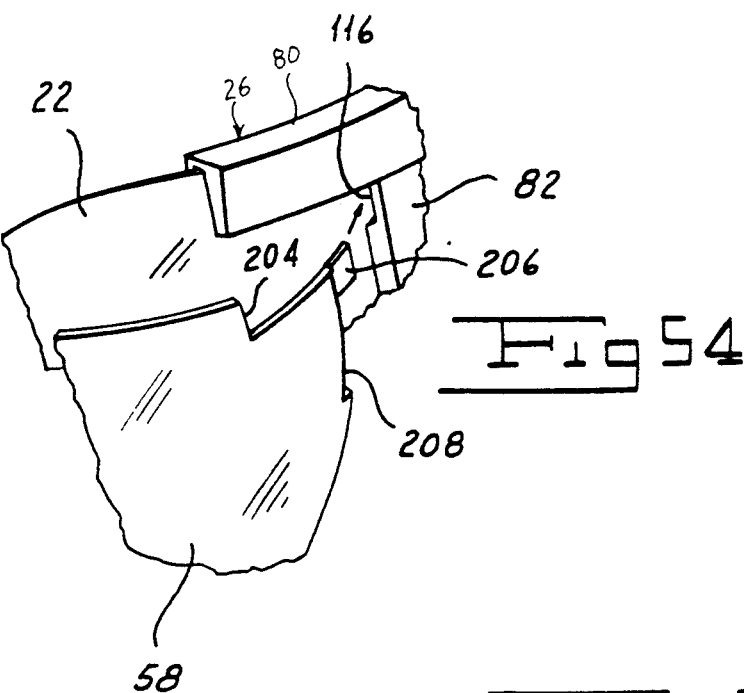
FIG. 54 is a perspective view illustrating the fitting of the right sunshade attachment lens onto the right primary lens.

Referring now to FIGS. 23 to 28 and 54, sunshade attachment lenses 58 and 60 are formed with cutouts 204 along the nasal portions of their upper edges which are complementary to the adjacent surface portions of bridge 26. Attachment lenses 58 and 60 may be formed of the same material as primary lenses 22 and 24. Each of the lenses 58 and 60 is formed with a tab 206 extending toward the wearer's nose at the top of the nasal edge portion of the lens. As shown in FIG. 26 for lens 60, tab 206 is also stepped slightly rearwardly relative to the surface of the lens. As shown in FIG. 54 for right attachment lens 58, tab 206 is inserted into the slot formed by the primary lens 22 or 24 and the recess 116 formed at the upper end of the front lip 112 (see also FIGS. 11 and 12). Lip 112, which abuts the front surface of lens 22 or 24, fits into a recess 208 formed along the upper portion along the nasal edge of the lens 58 or 60.

Each of lenses 58 and 60 is also formed with a socket 210 on its temporal edge which fits over socket 160 or 162 of lens 22 or 24. A rearwardly extending catch 212 (FIGS. 25 and 27) fits into the front opening 172 (FIG. 6) of passage 164 of socket 160 or 162 to secure the temporal edge of the attachment lens 58 or 60 to the primary lens 22 or 24. A small projection 213 formed on the lower portion of the attachment lens spaces the lens from the adjacent surface of the primary lens 22 or 24 to minimize the possibility of scratching. Each attachment lens 58 or 60 is fitted over the corresponding primary lens 22 or 24 by first inserting nasal tab 206 into the slot 116 formed in the corresponding front lip 112 of bridge 26 (FIG. 54). Projection 212 is then fitted into passage 164 of primary lens socket 160 or 162 to snap the secondary lens into place. The reverse procedure is used to remove the secondary lens 58 or 60 from the primary lens 22 or 24.

Laser attachment lenses 62 and 64 are identical to sunshade attachment lenses 58 and 60 except for the spectral transmission properties of the materials. The manner of attachment of right and left laser attachment lenses 62 and 64 to primary lenses 22 and 24 is likewise identical.

As noted above, as an alternative to using nonprescription primary lenses 22 and 24, the wearer may use corrective lens frames 40 and 42. Referring now to FIGS. 32 to 38, each of frames 40 and 42, which may be formed of the same transparent plastic as primary lenses 22 and 24, is similar in overall outline to primary lens 22 or 24, but has a lens opening 218 for receiving a corrective lens 36 or 38. Each corrective lens frame 40 or 42 also has an insertion portion 214 similar to insertion portion 66 of primary lenses 22 and 24, as well as a temporal socket 216 similar to sockets 160 and 162 of lenses 22 and 24. The structure and function of these portions of lens frames 40 and 42 is similar to that of the corresponding portions of primary lenses 22 and 24, as is the manner of attachment to bridge 26 and temples 44 and 46 or headband anchors 52 and 54.

Referring now to FIGS. 29 to 31, each of corrective lenses 36 and 38, which may be formed of the same material as primary lenses 22 and 24, has a convex front surface 220 and a concave rear surface 222. Front surface 220 lies along the surface of a sphere S4 of radius r4 having a center C3 along the optical axis OA of the lens 36. Correspondingly, rear surface 222 lies along the surface of a sphere S1 of radius r1 having a center C1 along the same optical axis OA. Since in the particular example shown in FIGS. 29 to 31, lens 36 is a minus lens, the radius r4 of the front surface 220 is larger than the radius r1 of the rear surface 222. A rear beveled peripheral edge portion 226 adjacent to rear surface 222 and a front beveled peripheral edge portion 224 in front of rear portion 224 meet along a bevel 225. The surfaces 224 and 226 form a bevel angle $\theta$ (FIG. 31) of 115° in the embodiment shown. Lens bevel 225 lies along the surface of a sphere S2 of radius r2 having a center C2 along the optical axis OA of the lens 36. The distance d1 between the bevel surface sphere S2 and the concave surface sphere S1 at the optical axis OA is one millimeter, as is the distance d2 between the bevel surface sphere S2 and the convex surface sphere S4. Front beveled edge portion 224 extends between sphere s2 and a sphere S3 also centered at C2, but having such a radius r3 that sphere S3 coincides with sphere S4 on the optical axis OA of the lens 36. A transitional peripheral edge portion 228, which may be generally parallel to the optical axis OA of the lens 36, extends between the front beveled edge portion 224 and the convex front surface 220 of the lens 36.

By forming the bevel 225 along the surface of a sphere S2, the radius of which does not vary with that of the front surface sphere S4, I am able to fit lens 36 into a frame of given dimensions regardless of the prescriptive power of the lens or the curvature of the front lens surface 220. By contrast, prior-art lens designs use a bevel surface sphere S2 that is concentric with the front surface sphere S4, and whose radius therefore varies with the prescription of the lens. This prior-art design severely limits the ability of a single frame to accept lenses of different front surfaces.

Referring again to FIGS. 32 to 38, lens openings 281 of frames 40 and 42 have rear beveled edge portions 230 complementary to rear beveled surface portions 226 of lenses 36 and 38. Each lens opening 218 has an upper retaining boss 234 at the midline of the upper edge as well as two lower retaining bosses 236 and 238 equally spaced from the lens midline. Bosses 234, 236 and 238 have respective rear surface portions 240, 242 and 244 complementary to front beveled portion 224 of lens 36 or 38. Respective slots 241, 243 and 245 formed in beveled portion 230 behind respective bosses 234, 236 and 238 facilitate movement of the mold inserts used to form the lens frames 40 and 42 with bosses 234 to 238. A forwardly facing transition surface portion 232 extends between rear beveled portion 230 of each lens opening and the front surface of the frame 40 or 42. Lenses 40 and 42 are snapped into place in openings 218 by seating them in the openings and then pushing the lenses rearwardly until the lens bevels 225 snap into place behind the beveled portions 240, 242 and 244 of retaining bosses 234 to 238. The lenses 36 and 38 may be removed from frames 40 and 42 simply by pushing the lenses forwardly to free the bevels 225 from bosses 234 to 238. Since the rear beveled edge portion 230 of each opening 218 extends around the entire inner periphery of the opening, any chance that the lens 36 or 38 can be pushed rearwardly against the wearer's eye is minimized.

Figure 49:
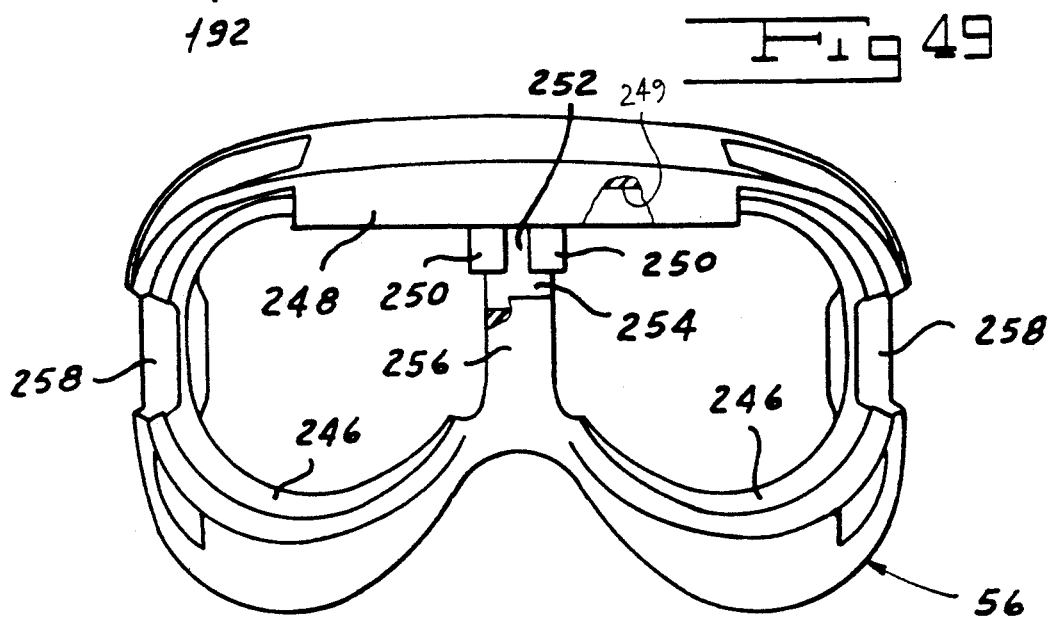
FIG. 49 is a front elevation of the goggle frame of the assembly shown in FIG. 1.

Referring now to FIG. 49, sun-wind-dust attachment or goggle frame 56, comprising noncellular polyurethane or other suitable elastomer, is formed with a pair of eye openings 246 complementary to the peripheral edges of primary lenses 22 and 24 or prescriptive lens frames 40 and 42. Frame 56 also has a flap 248 which extends across the front of the brow portion of the goggle and which is formed with a slot 249 for receiving the transversely extending brow bar 80 of bridge 26. The interocular portion of frame 56 comprises opposing portions 250 defining a vertical slot 252 for receiving angle portion 90 of bridge 26. Frame portions 250 together with a lower portion 256 define a horizontal slot 254 for receiving the reinforcement portion 92 of bridge 26.

Figure 55:
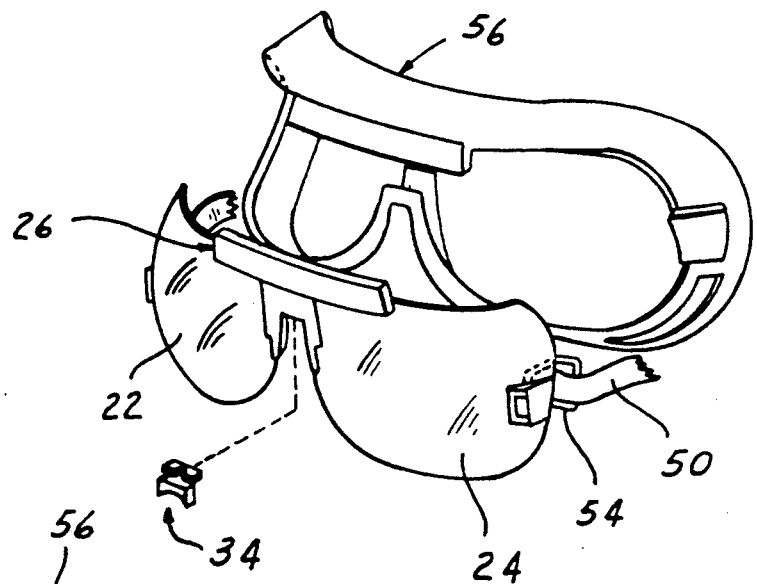
FIG. 55 is a perspective view of the primary lens-bridge subassembly before it is fitted on the goggle frame.
Figure 56:
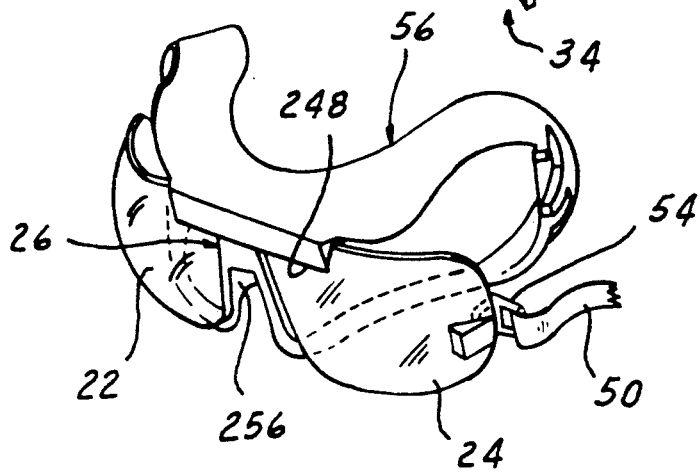
FIG. 56 is a perspective view of the primary lens-bridge subassembly after it is fitted on the goggle frame.

Referring now also to FIGS. 55 and 56, in use of the goggle frame 56, primary lenses 22 and 24 or lens frames 40 and 42 are first secured to bridge 26 as well as to headband anchors 52 and 54 in the manner described above (FIG. 55). However, in this particular configuration, the bridge 26 does not receive either the brow pad 28 or the nose pad 34, since the bridge does not directly contact the wearer and since the pads would otherwise interfere with portions of the frame 56. The subassembly comprising the primary lenses, bridge 26 and headband anchors 52 and 54 is then fitted upon the front of frame 56 by inserting portions 90 and 92 of bridge 26 (FIGS. 11 and 12) into respective slots 252 and 254 of the frame and then inserting brow bar 80 of the bridge into slot 249 of flap 248. When the bridge 26 is joined to the goggle 56 in this manner, the primary lenses 22 and 24 will be seated in lens openings 246 while anchors 52 and 54 will be seated within slots 258 formed in the temporal edges of openings 246. The tightness of the goggle assembly on the wearer's head may be adjusted by suitably tightening the headband 50. If desired, attachment lenses 58 and 60 or 62 and 64 may also be used by snapping them into position over the primary lenses in the manner described above.

The eyewear system 20 can be configured in any one of twenty-four ways. First, the bridge 26 can be fitted with either (1) plano primary lenses 22 and 24 or (2) lens frames 40 and 42 carrying corrective lenses 36 and 38. Second, the subassembly comprising the bridge 26 and the selected viewing elements can be supported on the head by means of (1) temples 44 and 46, nose pad 34 and brow pad 28, (2) the same elements supplemented by retaining strap 48, (3) headband 50 and pads 34 and 28, or (4) headband 50 and goggle frame 56. Third, each of the above assemblies can be worn (1) without attachment lenses, (2) with sunshade attachment lenses 58 and 60, or (3) with laser attachment lenses 62 and 64. In addition to these combinations, sizing for various interpupillary distances may be provided by including in the kit a plurality of bridges with different spacings between nasal rests 88 (FIG. 11).

As noted above, once the bridge 26 is fitted with the selected viewing elements (plano lenses 22 and 24, or lens frames 40 and 42 with corrective lenses 36 and 38) and the locks 30 and 32 inserted, the subassembly cannot be disassembled without special tools. However, the subassembly so formed may be freely be connected to, or disconnected from, the other parts of the kit as may be required for a particular application. Thus, to make a pair of spectacles assembled from the system 20 compatible with headphones, the wearer removes the temples 44 and 46 in the manner described above and replaces them with headband 50 and anchors 52 and 54. To convert this configuration in turn to a pair of goggles, the wearer removes brow pad 28 and nose pad 34, replacing them with goggle frame 56. In addition to reconfiguring the system, the wearer may also replace worn or damaged parts, as well as parts that have been rendered obsolete by subsequent technology.

It will be seen that I have accomplished the objects of my invention. My eyewear system protects against a broad range of hazards, and can be used by a wide range of subjects without requiring manufacture and stocking of various sizes of assembly. My eyewear system can be used by both ametropic and emmetropic subjects, and is compatible with headphones. My eyewear system may be quickly adapted as conditions change, without special tools, and may readily be modified to incorporate new technology or to replace damaged components.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Eyewear including in combination a front comprising a bridge and respective left and right primary elements each having a transparent portion, each primary element having a temporal portion comprising a forwardly extending projection including a fore-and-aft extending passage, a pair of members elongated in a fore-and-aft direction and adapted to be inserted into the respective passages and locked therein by being drawn aft, a left and a right temple each pivotally mounted on a corresponding member, each temple having a portion which is operable to prevent forward movement of the corresponding member when the temple is pivoted to a position capable of securing the front to the head of a wearer, and respective left and right secondary elements which are generally transparent and selectively attenuate certain wavelengths of radiation and which are adapted to be placed in front of the primary elements, each secondary element having a first temporal portion which receives a corresponding primary element projection and a second temporal portion which is insertable into a forward portion of a corresponding passage and prevents forward movement of the corresponding member.

2. Eyewear including in combination a front comprising a bridge and respective left and right primary elements each having a transparent portion, each primary element having a temporal portion forming a fore-and-aft extending passage having a sidewall provided with an opening therein of limited extent, a pair of members elongated in a fore-and-aft direction and adapted to be inserted through the respective sidewall openings into the respective passages and locked therein by being drawn aft, and means attached to said members for securing the front to the head of a wearer.

3. Eyewear as in claim 2 wherein the primary elements are generally transparent.

4. Eyewear as in claim 2 wherein each primary element comprises a frame retaining a lens.

5. Eyewear as in claim 4 wherein each frame is adapted to retain any one of a series of corrective lenses, each lens of the series having a bevel extending along its periphery, all bevels conforming to surfaces of spheres of equal radii, and each frame comprising retaining means contacting front and rear portions of a bevel.

6. Eyewear as in claim 4 wherein each frame comprises first retaining means contacting a rear edge of the lens over a major portion of its periphery and second retaining means contacting the front edge of the lens over a minor portion of its periphery.

7. Eyewear as in claim 6 wherein the sum of said major and minor portions is substantially equal to the periphery of the lens.

8. Eyewear as in claim 4 wherein each frame comprises retaining means contacting a front edge of the lens at a plurality of at least three discrete spaced regions of limited peripheral extent.

9. Eyewear as in claim 2 wherein the securing means comprises a headband having ends attachable to the pair of members and drawing them aft.

10. Eyewear as in claim 2 wherein the securing means comprises left and right temples each pivotally mounted on a corresponding member.

11. Eyewear as in claim 10 wherein each temple has a portion which is operable to prevent forward movement of the corresponding member when the temple is pivoted to a position for securing the front to the head.

12. Eyewear as in claim 2 further including left and right secondary elements which are generally transparent and adapted to be placed in front of the respective primary elements.

13. Eyewear as in claim 12 wherein the secondary elements selectively attenuate certain wavelengths of radiation.

14. Eyewear as in claim 12 wherein each secondary element has a temporal portion which is insertable into a forward portion of a corresponding passage and prevents forward movement of the corresponding member.

15. Eyewear as in claim 12 wherein the temporal portion of each primary element comprises a forwardly extending projection including the passage and wherein each secondary element has a temporal portion which receives the corresponding projection.

16. Eyewear as in claim 12 wherein each secondary element has a nasal tab which is insertable into a corresponding nasal slot formed at least partly in the bridge.

17. Eyewear as in claim 2 wherein the bridge has respective transverse slots extending to the left and to the right, each primary element having an upper nasal portion adapted to be received in a corresponding slot.

18. Eyewear as in claim 17 further including a pair of inserts adapted to be placed into respective apertures formed in the top of the bridge for locking the primary elements in the slots.

19. Eyewear as in claim 2 further including means comprising a unitary resilient member removably mateable with the front for forming a peripheral seal between the front and the face of a wearer.

20. Eyewear as in claim 2 further including a pad removably attachable to the bridge and adapted to bear against the brow of a wearer.

21. Eyewear as in claim 2 wherein the bridge has a nosepiece portion, further including a pad removably attachable to said nosepiece portion and adapted to bear on the nose of a wearer.

* * * * *